(12) United States Patent
Koike

(10) Patent No.: US 7,632,566 B2
(45) Date of Patent: Dec. 15, 2009

(54) PAPER FOR CARD, METHOD FOR PRODUCING SAME AND PLAYING CARDS

(75) Inventor: Hiroshi Koike, Ibaraki (JP)

(73) Assignee: Yupo Corporation, Tokyo (JP)

( * ) Notice: Subject to any disclaimer, the term of this patent is extended or adjusted under 35 U.S.C. 154(b) by 216 days.

(21) Appl. No.: 11/176,673

(22) Filed: Jul. 8, 2005

(65) Prior Publication Data
US 2007/0187054 A1   Aug. 16, 2007

(30) Foreign Application Priority Data
Jun. 16, 2005   (JP) .............................. 2005-176779

(51) Int. Cl.
*B32B 3/26* (2006.01)

(52) U.S. Cl. .............. 428/316.6; 428/319.3; 428/319.7; 428/317.9

(58) Field of Classification Search .............. 428/319.3, 428/319.7, 317.9, 316.6
See application file for complete search history.

(56) References Cited

U.S. PATENT DOCUMENTS

| 5,494,735 | A  | * | 2/1996 | Nitta ........................... 428/207 |
| 6,916,047 | B2 | * | 7/2005 | Jarvis et al. .................. 283/102 |

FOREIGN PATENT DOCUMENTS

JP   61-198   7/1986

OTHER PUBLICATIONS

English abstract of JP07-068908 A, Imaishi et al, Mar. 14, 1995.*

* cited by examiner

*Primary Examiner*—Hai Vo
(74) *Attorney, Agent, or Firm*—Browdy and Neimark, PLLC

(57) ABSTRACT

Paper for card, characterized in that it has a laminate structure of a porous white film (A) symmetrically put on both faces of a masking layer (B) and the surface and the back thereof have a pencil hardness of from 4H to 9H. The card paper has good flexibility and stability, curls little and has good scratch resistance, maskability and printability.

13 Claims, 1 Drawing Sheet

PAPER FOR CARD, METHOD FOR PRODUCING SAME AND PLAYING CARDS

BACKGROUND OF THE INVENTION

1. Field of the Invention

The paper for card of the present invention has good flexibility and stability suitable to cards such as playing cards, game cards, trading cards, scratch cards, prepaid cards, certificates; and the invention relates to plastic paper for cards curling little and having good scratch resistance, maskability an printability, and to a method for producing it.

2. Description of Related Art

Playing cards must have both good flexibility and stability to deformation when shuffled.

For playing cards required to have durability, mainly used are plastic cards. In particular, polyvinyl chloride cards are mainly used having both good flexibility and stability. However, polyvinyl chloride cards are problematic in point of their sanitary aspect in that they give dioxin when incinerated, a large amount of plasticizer is added to them for making them flexible, and therefore the plasticizer may bleed out on the surface of playing cards during use and may adhere to users' hands. In addition, since the plasticizer may adhere to users' hands, another drawback of the cards is that the users' fingerprints and handprints may be left on the cards and the cards may be thereby readily differentiated.

On the other hand, polyolefin cards were invented and have been put into practical use as cards gentle to the environment, which do not generate any harmful gas such as dioxin when incinerated and which are free from bleeding of plasticizer during use (see JP-UM-B-61-198).

However, conventional cards are not so much tough and could follow deformation, but their stability is unsatisfactory. Therefore, when playing cards are fully reshuffled, they may be deformed and their deformation may become permanent, or they may have folded wrinkles and could not be used any more in some cases. For playing cards, it is important that their front patterns could not be identified from their back. Conventional playing cards have good maskability and are therefore satisfactory in their capability that their front patterns could not be identified from their back. However, their surface strength is insufficient, and when they are beaten with a hard substance such as coin or chip or when their edges are rubbed with a nail, then the cards may be readily marked and are therefore unsuitable to practical use.

Accordingly, the present invention is to solve the problems with the prior art, and the problem that the invention is to solve is how to provide extremely excellent paper for cards. Specifically, the invention is to provide plastic paper for cards having both good flexibility and good stability, curling little and having all good scratch resistance, good maskability and good printability, and to provide a method for producing cards that use it.

SUMMARY OF THE INVENTION

To solve the problems, we, the present inventors have assiduously studied and, as a result, have found that, when a sheet having a specific structure is formed, then it may provide card paper and cards having the intended properties, and therefore completed the present invention.

Specifically, the invention provides paper for card, wherein it has a laminate structure of a porous white film symmetrically put on both faces of a masking layer and the surface and the back of the paper have a pencil hardness of from 4H to 9H. The masking layer may be an adhesive layer alone containing from 1 to 80% by weight of pigment, or may comprise at least two layers of a color pigment layer and an adhesive layer. Further, it may have a structure of a color pigment layer, an adhesive layer and a color pigment layer laminated in that order. Preferably, the white film is stretched at least monoaxially, and it may be a multi-layered structure containing a biaxially-stretched layer.

Preferably, the porosity of the card paper of the invention is from 1 to 25%. Also preferably, the white film comprises from 30 to 99% of a thermoplastic resin and from 1 to 70% of an inorganic fine powder and/or an organic filler. More preferably, the thermoplastic resin is a polyolefin. Preferably, the thickness of the card paper of the invention is from 80 to 1000 µm; and the flexural modulus of elasticity thereof is from 3500 to 10000 MPa. Also preferably, the whole light transmittance of the card paper is at most 1.0%. Also preferably, a 10 cm×10 cm sheet of the card paper has a maximum curl height of at most 3 mm after maintaining under a condition of 60° C. for 7 days.

The card paper of the invention may be produced according to a method of laminating one white film with a color pigment layer formed thereon to another white film with an adhesive layer formed thereon; or may also be produced according to a method of applying an adhesive containing from 1 to 50% of a pigment to one white film followed by laminating another white film to it. Further, it may also be produced according to a method of forming a color pigment layer on both white films, then forming an adhesive layer on the color pigment layer-formed face of one white film, and laminating it to the ink layer of the other color pigment layer-formed white film.

The card paper of the invention can be used as a playing card by printing its both faces, or by printing its both faces and then forming a clear layer on at least one face thereof.

The card paper of the invention has good flexibility and stability, curls little and has good scratch resistance, maskability and printability. According to the invention, it is possible to provide card paper which does not give dioxin when incinerated and is free from bleeding of plasticizer and which is therefore excellent in point of the environmental sanitary aspect thereof. The card paper of the invention can be utilized for various cards such as playing cards, game cards, trading cards, scratch cards, prepaid cards, certificates.

Figure 1:
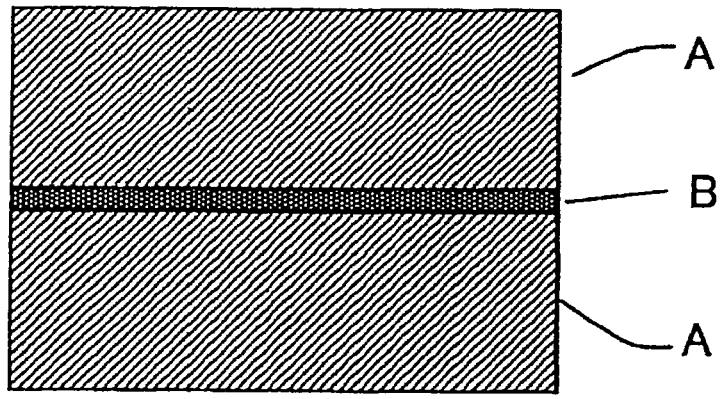
FIG. 1 is one example of the layer structure of the card paper of the invention.

In the drawings, A is a white film; B is a masking layer; B-1 is a color pigment layer; B-2 is an adhesive layer.

BEST MODE FOR CARRYING OUT THE INVENTION

The card paper of the invention is described in detail hereinunder. In this description, the numerical range expressed by the wording "a number to another number" means the range that falls between the former number indicating the lowermost limit of the range and the latter number indicating the uppermost limit thereof.

[Characteristics of Card Paper]

In the invention, a white film having a specific porous structure is symmetrically laminated on both faces of a masking layer to thereby provide card paper having good flexibility and stability, curling little, and having good maskability and good printability. The card paper of the invention is characterized in that its surface and back have a pencil hardness of from 4H to 9H.

[White Film]

The white film for use in the card paper of the invention is a porous thermoplastic resin film. Controlling the porosity of the white film makes it possible to provide card paper having good flexibility and stability and having good printability and pencil hardness.

The thermoplastic resin for the white film is not specifically defined in point of its type, so far as it is formable into films. Preferably, however, the resin gives little dioxin when incinerated. Examples of the thermoplastic resin are ethylene-based resins such as high-density polyethylene, middle-density polyethylene, low-density polyethylene; propylene-based resins; olefin-based resins such as polymethyl-1-pentene; functional group-containing olefin-based resins such as ethylene-vinyl acetate copolymer, ethylene-acrylic acid copolymer, maleic acid-modified polyethylene, maleic acid-modified polypropylene; polyamide resins such as nylon-6, nylon-6,6; thermoplastic ester resins such as polyethylene terephthalate and its copolymer, polybutylene terephthalate, aliphatic polyesters, polyethylene succinate, polybutylene succinate, polyethylene adipate; polylactic acid, polyvinyl alcohol, polycarbonate, atactic polystyrene, syndiotactic polystyrene. Of those thermoplastic resins, preferred are olefin-based resins as having good workability.

More specific examples of the olefin-based resins are homopolymers of an olefin alone such as ethylene, propylene, butylene, butadiene, isoprene, chloroprene, methyl-1-pentene; copolymers of two or more such olefins; and copolymers with a functional group-containing monomer such as styrene, α-methylstyrene, vinyl acetate, vinyl alcohol, acrylic acid derivative, vinyl ether.

Of those olefin-based resins, preferred are propylene-based resins in view of their chemical resistance and cost. For the propylene-based resins, preferably used as the main ingredient thereof is a propylene homopolymer, polypropylene that is isotactic or syndiotactic or has any other various degree of stereospecificity; or a copolymer comprising propylene as the main ingredient thereof and copolymerized with an α-olefin such as ethylene, 1-butene, 1-hexane, 1-heptane, 4-methyl-1-pentene. The copolymer may be a binary or ternary copolymer, or may be a random copolymer or a block copolymer. Preferably, the propylene-based resin for use herein is mixed with from 2 to 25% by weight of a resin having a lower melting point than the propylene homopolymer. Examples of the resin having a low melting point are high-density or low-density polyethylene.

If desired, the white film may contain an inorganic fine powder and/or an organic filler, a stabilizer, a light stabilizer, a dispersant, a lubricant or the like added thereto.

The inorganic fine powder, if added, may generally have a particle size of from 0.01 to 15 μm, preferably from 0.01 to 5 μm. Concretely, it includes calcium carbonate, calcined clay, silica, diatomaceous earth, white clay, talc, titanium oxide, barium sulfate, alumina, zeolite, mica, sericite, bentonite, sepiolite, vermiculite, dolomite, wollastonite, glass fibers. In addition, when such an inorganic fine powder is used, then it is desirable that its surface is previously treated for hydrophilication and/or oleophilication. The surface treatment may improve the dispersibility of the powder.

When an organic filler is added, then a resin that differs from the thermoplastic resin as the main ingredient of the film is preferably selected for it. For example, when the thermoplastic resin film is a polyolefin resin film, then the organic filler may be a polymer such as polyethylene terephthalate, polybutylene terephthalate, polycarbonate, nylon-6, nylon-6,6, cyclic olefin, polystyrene or polymethacrylate, which has a higher melting point (for example, 170 to 300° C.) or glass transition temperature (for example, 120 to 280° C.) than the melting point of the polyolefin resin and which is immiscible with the polyolefin resin.

Adding an inorganic fine powder and/or an organic filler to the white film may improve the printability of the film and improve the workability thereof into card paper.

Preferably, the content of the inorganic fine powder and/or the organic filler in the white film is from 1 to 70% by weight, more preferably from 2 to 60% by weight. Also preferably, the content of the thermoplastic resin in the film is from 30 to 99% by weight, more preferably from 40 to 98% by weight.

If the content of the inorganic fine powder and/or the organic filler is at least 1%, then the pore formation and the porosity control in the stretching step to be mentioned below may be easy, and the card paper may readily have both good flexibility and good stability, and, in addition, the printability of the card paper may be bettered. If the content is at most 70%, then stretching the film to be mentioned below may be easier.

[Formation of Resin Film]

The method of forming the white film is not specifically defined. Concrete methods for it include a casting method of sheetwise extruding a resin melt through a single-layered or multi-layered T-die or I-die connected to a screw-type extruder; an inflation-forming method of tubewise extruding a resin melt through a circular die followed by inflating it by the action of the inner air pressure; and a calendering or rolling method of rolling a mixed material with plural hot rolls to thereby form it into a sheet.

[Lamination]

The white film may be laminated in various known methods. Concrete methods for it include a co-extrusion method of laminating the films through a die; and an extrusion lamination method of using plural dies. If desired, these methods may be combined for use herein.

[Stretching]

In general, the white film may be stretched according to any of various methods generally used in the art.

The stretching temperature may fall within a known temperature range favorable to stretching of thermoplastic resin, from the glass transition point temperature of the thermoplastic resin mainly used for the white film to the melting point of the crystal part thereof. Concretely, when the thermoplastic resin of the white film is a propylene homopolymer (melting point, 155 to 167° C.), then the stretching temperature may be from 100 to 166° C.; and when the resin is a high-density polyethylene (melting point, 121 to 136° C.), then the temperature may be from 70 to 135° C., or that is, the temperature is lower by from 1 to 70° C. than the melting point of the resin. Preferably, the stretching speed is from 20 to 350 m/min.

The stretching method is described. When a cast film is stretched, the casting method for it includes longitudinal stretching by utilizing the peripheral speed difference between rolls, lateral stretching by the use of a tenter oven, and simultaneous biaxial stretching by a combination of a tenter oven and a linear motor. For stretching an inflation film, employable is simultaneous biaxial stretching according to a tubular method.

Not specifically defined, the draw ratio may be suitably determined in consideration of the properties of the thermoplastic resin used for the white film. For example, when a propylene homopolymer or copolymer is used for the thermoplastic resin and when the film is stretched in one direction, then the draw ratio is preferably from about 1.2 to 12 times, more preferably from 2 to 10 times. When the film is stretched biaxially, then the areal draw ratio is preferably from 1.5 to 60 times, more preferably from 4 to 50 times. When any other thermoplastic resin is used and when the film is stretched in one direction, then the draw ratio is preferably from 1.2 to 10 times, more preferably from 2 to 5 times. When the film is stretched biaxially, then the areal draw ratio is preferably from 1.5 to 20 times, more preferably from 4 to 12 times.

Thus obtained, the stretched film has a large number of fine pores inside it. Owing to the presence of pores therein, it is more flexible than the stretched film not having pores therein, and, in addition, owing to the light diffusion at the pores therein, the film may have increased opacity and whiteness.

Preferably, the thickness of the white film is from 40 to 500 µm, more preferably from 50 to 400 µm. Having a thickness of at least 40 µm, the film may have good toughness enough for card paper. Having a thickness of at most 500 µm, the thickness of the card paper that comprises the film may be more suitable for use as playing cards.

Preferably, the white film is stretched in at least monoaxial direction, and it may have a two-layered structure or a three-layered or more multi-layered structure. The number of stretching axes of the multi-layered structure may be monoaxial/monoaxial, monoaxial/biaxial, biaxial/monoaxial, monoaxial/monoaxial/biaxial, monoaxial/biaxial/monoaxial, biaxial/monoaxial/monoaxial, monoaxial/biaxial/biaxial, biaxial/biaxial/monoaxial, or biaxial/biaxial/biaxial. Having the multi-layered structure, the white film may have various additional functions of improving the printability of the film and the workability thereof into card paper, increasing the pencil hardness of the film and improving the flexural modulus of elasticity thereof.

[Sticking]

In the card paper of the invention, a white film must be laminated on both faces of a masking layer. In this, a white film is laminated symmetrically on both faces of a masking layer. The technique of "symmetrically laminating a white film" as referred to herein means that white films which are substantially the same in point of the material and the shape thereof are plane-symmetrically laminated. The wording substantially the same as referred to herein means that the films have the sameness to such a degree that the intended effect of the invention can be obtained. For example, the thickness difference between two white films is preferably within ±10%, more preferably within ±5%, even more preferably within ±2%. Most preferably, two white films are completely the same in point of the material and the shape thereof.

For laminating the films, preferably employed is a dry-lamination method of continuously sticking the films via rolls immediately after the coated adhesive has been dried; or a method comprising applying an adhesive to the films that have been previously cut into sheets, with a coater, then drying them and sticking them under pressure with rolls.

The adhesive may be any known one. Concretely, its typical examples are polyester resins, polyether resins, polyurethane resins, acrylic adhesives, epoxy resins, ABS resins, rubber adhesives, silicone adhesives.

Regarding their form, the adhesives may be solvent-type, emulsion-type or hot-melt-type adhesives. In general, a solvent-type adhesive or an emulsion-type adhesive may be applied to the films.

The adhesive may be applied to the films by the use of a roll coater, a blade coater, a bar coater, an air-knife coater, a gravure coater, a reverse coater, a die coater, a lip coater, a spray coater or a comma coater, and, if desired, it may be smoothed. After dried, the intended adhesive layer may be formed.

Preferably, the thickness of the adhesive layer is from 0.1 to 30 µm, more preferably from 0.2 to 20 µm.

[Masking Layer]

In the card paper of the invention, the masking layer is for supplementing the masking property of the card paper, which is unsatisfactory when the white film alone is used, and this is provided in the center of the card paper. The masking layer has maskability to such a degree that, after the surface of the card paper is printed with a pattern and thereafter when light from a fluorescent lamp (30 W) and a halogen light (100 W) is applied to it, then the surface pattern could not be read through the back of the card paper.

The masking layer is preferably a pigment-containing layer. The pigment for use in the layer may be any known color pigment such as carbon black, titanium oxide, titanium oxide whiskers. The mean particle size of the pigment for use in the masking layer is preferably from 0.01 to 20 µm, more preferably from 0.05 to 10 µm.

Figure 2:
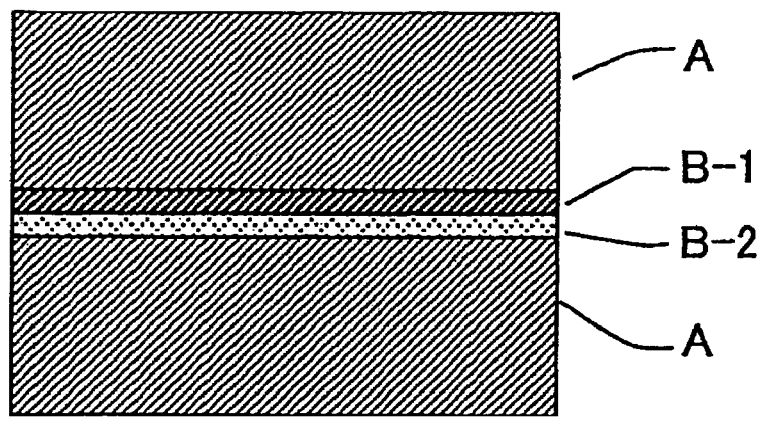
FIG. 2 is one example of the layer structure of the card paper of the invention.
Figure 3:
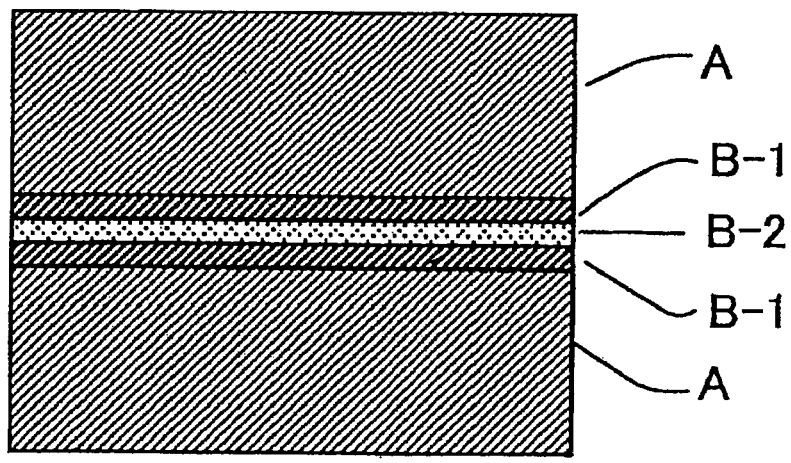
FIG. 3 is one example of the layer structure of the card paper of the invention.

The masking layer may be one layer alone of an adhesive mixed with a color pigment (FIG. 1); or may have a structure comprising a color pigment layer and an adhesive layer (e.g., FIG. 2). When a color pigment layer and an adhesive layer are separately provided, then the color pigment layer and the adhesive layer each may have a structure of two or more layers. Providing two or more color pigment layers makes it possible to produce card paper of high maskability (e.g., FIG. 3).

When the masking layer is formed of one layer only, then a color pigment is added to an adhesive to form the layer. The color pigment content of the layer is preferably from 1 to 80% by weight, more preferably from 5 to 70% by weight. The adhesive content of the layer is preferably from 1 to 99% by weight, more preferably from 30 to 95% by weight.

When a color pigment layer and an adhesive layer are separately formed, the color pigment content of the color pigment layer is preferably from 1 to 80% by weight, more preferably from 5 to 70% by weight; and the content of the binder component in the color pigment layer is preferably from 20 to 99% by weight, more preferably from 30 to 95% by weight. When the color pigment content of the layer is at least 1% by weight, then the card paper may readily have sufficient maskability; and when it is at most 80% by weight, then the masking layer may have sufficient strength to prevent the card paper from being delaminated. When a color pigment layer and an adhesive layer are separately formed, the ratio of the thickness of the color pigment layer to that of the adhesive layer is preferably from 1:0.1 to 1:10, more preferably from 1:0.2 to 1:5. When two or more layers are provided for the color pigment layer and the adhesive layer, then it is desirable that the overall thickness of the layers is within the range of the ratio as above.

The masking layer in the card paper of the invention may contain both a color pigment layer not containing an adhesive and a color pigment layer containing an adhesive (an adhesive layer containing a color pigment). In addition, it may further contain an adhesive layer not containing a color pigment. In the invention, these layers may be suitably combined to form the masking layer.

The thickness of the masking layer in the card paper of the invention is preferably from 0.1 to 20 µm, more preferably from 0.3 to 15 µm. When the thickness of the masking layer is at least 0.1 µm, then the card paper may readily have sufficient maskability; and when it is at most 15 µm, then the thickness fluctuation of the color pigment layer may be readily controlled and therefore card paper having uniform rigidity and stable quality may be readily produced.

Preferably, the thickness of the card paper of the invention is from 80 to 1000 µm, more preferably from 100 to 800.

[Heat Treatment]

After laminated, the card paper of the invention may be subjected to heat treatment. When the card paper produced through lamination is curled during heat treatment, then the curling may be removed and, as a result, card paper that curls little may be obtained. In addition, the heat treatment may promote the curing of the adhesive, and the adhesion strength of the white film may be therefore stabilized within a short period of time. The temperature range for the heat treatment is preferably from 30° C. to 120° C., more preferably from 30° C. to 100° C. The processing time varies, depending on the heat-treatment temperature, but is preferably within a range of from 1 to 72 hours.

[Printing]

The card paper of the invention may be printed on one surface and/or both surfaces thereof, and the card paper of the invention may therefore have various applications. For the printing, employable is any known method of offset printing, lithographic printing, gravure printing, flexographic printing, letter-press printing, silk-screen printing, inkjet printing, thermal recording, thermal transfer recording or electrophotographic recording.

Further if desired, a clear layer may be provided on the printed face of the card paper. For forming the clear layer, employable is any known method of printing with clear ink, application of transparent resin, lamination of transparent film, or extrusion lamination of transparent resin melt. The clear layer may be formed in the printing process or may be formed in a process different from the printing process.

[Pencil Hardness]

The pencil hardness of the surface and the back of the card paper of the invention is from 4H to 9H, preferably from 5H to 9H. If the pencil hardness is lower than 4H, then the surface strength is insufficient and, as a result, the surface may be marked by beating it with a coin or scratching it with a nail. If so, for example, when the card paper is formed into playing cards, then there occurs a drawback in that the marked cards could be readily differentiated from the others.

The pencil hardness as referred to herein is a value measured under a load of 10 g according to the method described in JIS-K-5401-69.

[Porosity]

Preferably, the porosity of the card paper of the invention is from 1 to 25%, more preferably from 3 to 20%. When the porosity is at least 1%, then card paper that is hard and has sufficient flexibility is readily obtained. When the porosity is at most 25%, then the total strength of the card paper is good and the card paper could be therefore readily prevented from being scratched with nails and deformed. Preferably, the density of the card paper of the invention is from 1 to 25 g/m$^3$, more preferably from 3 to 20 g/m$^3$. When the density is at least 1 g/m$^3$, then the card paper may readily have sufficient flexibility; and when it is at most 30 g/m$^3$, then the total strength of the card paper is good and the card paper could be therefore readily prevented from being scratched with nails and deformed.

The porosity of the card paper as referred to herein is calculated according to the following equation (1), from the apparent density of the card paper and the true density of the card paper (the density measured after the card paper is pressed by a pressing machine heated at 270° C.):

$$\text{Porosity (\%)} = [(\rho 0 - \rho)/\rho 0] \times 100 \quad (1)$$

(wherein $\rho 0$ represents the true density of the card paper; and $\rho$ represents the apparent density of the card paper).

The apparent density $\rho$ as referred to herein is calculated according to the following equation (2), from the thickness and the weight of the card paper:

$$\text{Apparent density, } \rho = W/(T \times A) \quad (2)$$

(wherein T represents the thickness of the card paper; W represents the weight of the card paper; and A represents the area of the card paper measured).

The true density $\rho 0$ is determined according to an in-water substitution method of calculating it from the weight of the sample in air and the weight of the sample in water, and according to the method described in JIS-K-7112.

[Flexural Modulus of Elasticity]

The flexural modulus of elasticity of the card paper of the invention is preferably from 3500 to 10000 MPa, more preferably from 4000 to 8000 MPa. Having a flexural modulus of elasticity of at least 3500 MPa, the card paper is resistant to strain and has good stability, and even when the cards are deformed by fully reshuffling them, they may be readily restored to their original flat condition. Having a flexural modulus of elasticity of at most 10000 MPa, the card paper is flexible and therefore the cards may be hardly cracked.

The flexural modulus of elasticity of the card paper of the invention is measured according to JIS-K-7171. Concretely, the width is 30 mm; the length is 50 mm; the distance between supports is 20 mm; the test speed is 2 mm/min. Using an application test device (Shimadzu's AUTOGRAPH), the flexural modulus of elasticity of the card paper is calculated at a strain of 0.0005 and a bending stress of 0.0025. the flexural modulus of elasticity of the card paper is determined both in the cross direction and in the machine direction, and the higher value of the two is employed herein as the representative value.

[Maximum Curl Height]

The maximum curl height of the card paper of the invention is preferably at most 3 mm, more preferably at most 2 mm. When the maximum curl height is at most 3 mm, then the curl of the finished cards would not be too large even when they are stored for a long period of time, and therefore the card paper is more suitable to use for playing cards.

The maximum curl height of the card paper of the invention is described. A 10 cm×10 cm sheet sampled from the card paper to be analyzed is kept in an oven at a temperature of 60°±3° C. for 7 days, then taken out of it, and left at room temperature for 30 minutes. Next, this is put on a glass plate, and the height of the lifting four sides of the sample is determined on both the surface and the back thereof. The largest one of the thus-measured values is the maximum curl height of the card paper.

[Whole Light Transmittance]

The whole light transmittance of the card paper of the invention is preferably at most 1.0%, more preferably at most 0.5%. When the whole light transmittance is at most 1.0%, then the pattern on the surface of the card could not be identified from the back thereof, and therefore the card paper is more suitable to use for playing cards.

The whole light transmittance of the card paper in the invention is determined according to JIS-P-8118 by the use of a test device (Hitachi's U-3310), with which the transmittance (%) at different wavelengths of from 400 to 700 nm of the sample is measured, and the data are averaged.

EXAMPLES

The invention is described more concretely with reference to the following Production Examples, Examples, Comparative Examples and Test Examples. The material, the amount for use, the ratio and the operation mentioned below can be suitably changed or modified not overstepping the sprit of the invention. Accordingly, the scope of the invention should not be limited to the following Examples. Unless otherwise specifically indicated, "%" given hereinunder is by weight. The thermoplastic resin compositions for use in the Production Examples of the invention are all shown in Table 1.

TABLE 1

| Material | Details |
|---|---|
| Thermoplastic Resin Composition a | A composition prepared by adding 5% by weight of calcium carbonate [Shiroishi Calcium's Softon 1800] (mean particle size = 1.2 μm) to a mixture of 85% by weight of propylene homopolymer [Nippon Polypro's Novatec PP: FY4] (MFR (230° C., 2.16 kg load) = 5 g/10 min, melting point = 165° C.) and 10% by weight of high-density polyethylene [Nippon Polyethylene's Novatec HD; HJ360] (MFR (190° C., 2.16 kg load) = 5 g/10 min, melting point = 131° C.) was kneaded in an extruder set at a temperature of 230° C. This is thermoplastic resin composition a. |
| Thermoplastic Resin Composition b | A composition prepared by adding 15% by weight of calcium carbonate [Shiroishi Calcium's Softon 1800] (mean particle size = 1.2 μm) to a mixture of 75% by weight of propylene homopolymer [Nippon Polypro's Novatec PP: FY4] (MFR (230° C., 2.16 kg load) = 5 g/10 min, melting point = 165° C.) and 10% by weight of high-density polyethylene [Nippon Polyethylene's Novatec HD; HJ360] (MFR (190° C., 2.16 kg load) = 5 g/10 min, melting point = 131° C.) was kneaded in an extruder set at a temperature of 230° C. This is thermoplastic resin composition b. |
| Thermoplastic Resin Composition c | A composition prepared by adding 40% by weight of calcium carbonate [Shiroishi Calcium's Softon 1800] (mean particle size = 1.2 μm) to 60% by weight of propylene homopolymer [Nippon Polypro's Novatec PP: MA3] (MFR (230° C., 2.16 kg load) = 11 g/10 min, melting point = 165° C.) was kneaded in an extruder set at a temperature of 230° C. This is thermoplastic resin composition c. |

[Production of White Film]

Production Example 1

The thermoplastic resin composition (a) was kneaded in an extruder set at 230° C., and then fed to an extrusion die set at 250° C. and sheetwise extruded out through it. This was then cooled in a cooling device to obtain an unstretched sheet. The unstretched sheet was heated at 145° C. and then stretched 3.5-fold in the machine direction. After the thermoplastic resin composition (c) was kneaded in an extruder set at 250° C., this was sheetwise extruded out and laminated on both the surface and the back of the 3.5-fold stretched film that had been prepared in the above, to thereby obtain a three-layered laminate film. Next, the three-layered laminate film was cooled to 60° C. and then again heated at about 155° C. in a tenter oven in which this was stretched 8.0-fold in the lateral direction. Then, this was subjected to heat treatment in a heat set zone controlled at 160° C. Next, this was cooled to 60° C., and its edges were trimmed away. Its surface and back were subjected to corona discharge treatment at 40 W/m². Thus, a three-layered [70/60/70 μm: stretched layer constitution (monoaxial/biaxial/monoaxial)] white film having a thickness of 200 μm was obtained.

Production Example 2

The thermoplastic resin composition (b) was kneaded in an extruder set at 230° C., and then fed to an extrusion die set at 250° C. and sheetwise extruded out through it. This was then cooled in a cooling device to obtain an unstretched sheet. The unstretched sheet was heated at 145° C. and then stretched 3.5-fold in the machine direction. After the thermoplastic resin composition (c) was kneaded in an extruder set at 250° C., this was sheetwise extruded out and laminated on both the surface and the back of the 3.5-fold stretched film that had been prepared in the above, to thereby obtain a three-layered laminate film. Next, the three-layered laminate film was cooled to 60° C. and then again heated at about 155° C. in a tenter oven in which this was stretched 8.0-fold in the lateral direction. Then, this was subjected to heat treatment in a heat set zone controlled at 160° C. Next, this was cooled to 60° C., and its edges were trimmed away. Its surface and back were subjected to corona discharge treatment at 40 W/m². Thus, a three-layered [40/70/40 μm: stretched layer constitution (monoaxial/biaxial/monoaxial)] white film having a thickness of 150 μm was obtained.

Production Example 3

The thermoplastic resin composition (a) was kneaded in an extruder set at 230° C., and then fed to an extrusion die set at 250° C. and sheetwise extruded out through it. This was then cooled in a cooling device to obtain an unstretched sheet. The unstretched sheet was heated at 140° C., then stretched 4.5-fold in the machine direction, and thereafter further heated at 155° C. by the use of a heat-setting roll system with plural rolls. Then, this was cooled to 60° C., and its edges were trimmed away. Its surface and back were subjected to corona discharge treatment at 40 W/m². Thus, a single-layered monoaxially-stretched white film having a thickness of 170 μm was obtained.

Production Example 4

The thermoplastic resin composition (a) was kneaded in an extruder set at 230° C., and then fed to an extrusion die set at 250° C. and sheetwise extruded out through it. This was then cooled in a cooling device to obtain an unstretched sheet. The unstretched sheet was heated at 150° C., then stretched 3.5-fold in the machine direction. Next, this was again heated at about 155° C. in a tenter oven in which this was stretched 8.0-fold in the lateral direction. Then, this was subjected to heat treatment in a heat set zone controlled at 160° C. Next, this was cooled to 60° C., and its edges were trimmed away. Its surface and back were subjected to corona discharge treatment at 40 W/m². Thus, a single-layered biaxially-stretched white film having a thickness of 130 μm was obtained.

TABLE 2

| Production Example | Thickness (μm) total | Thickness (μm) constitutive layers | Stretching Direction of Layer | Filler Concentration in Layer (%) | Opacity (%) |
|---|---|---|---|---|---|
| 1 | 200 | 70/60/70 | monoaxial/biaxial/monoaxial | 40/5/40 | 88 |
| 2 | 150 | 40/70/40 | monoaxial/biaxial/monoaxial | 40/15/40 | 85 |
| 3 | 170 | 170 | monoaxial | 15 | 77 |
| 4 | 130 | 130 | biaxial | 5 | 55 |

[Production of Card Paper]

The color pigment coating compositions and the adhesive coating composition used in producing card papers in Examples are shown in Table 3.

TABLE 3

| | |
|---|---|
| Color Pigment Coating Composition (1) | 50% by weight of carbon black having a mean particle size of 21 nm [Tokai Carbon's trade name: Tokablack #7550F] was added to 50% by weight of urethane-type binder resin [Toyo Ink's trade name; NEW-LP Super R Medium], and diluted with toluene to have a solid concentration of 30% by weight. This is a masking composition. |
| Color Pigment Coating Composition (2) | 60% by weight of rutile-type titanium oxide having a mean particle size of 0.21 μm [Ishihara Sangyo's trade name: Taipake CR-60] was added to 40% by weight of urethane-type binder resin [Toyo Ink's trade name; NEW-LP Super R Medium], and diluted with toluene to have a solid concentration of 35% by weight. This is a masking composition. |
| Color Pigment Coating Composition (3) | 40% by weight of carbon black having a mean particle size of 21 nm [Tokai Carbon's trade name: Tokablack #7550F] was added to a mixture of 35% by weight of polyether-type adhesive [Toyo Morton's trade name: TM-317] and 25% by weight of a curing agent [Toyo Morton's trade name: CAT-11B], and diluted with toluene to have a solid concentration of 35% by weight. This is a masking adhesive composition. |
| Adhesive Coating Composition | A mixture of 60% by weight of polyether-type adhesive [Toyo Morton's trade name: TM-317] and 40% by weight of a curing agent [Toyo Morton's trade name: CAT-11B#] was diluted with toluene to have a solid concentralion of 25% by weight. This is an adhesive composition. |

Example 1

Using a gravure coater, the color pigment coating composition (3) was applied to the white film (Production Example 1) in a dry amount of 4 g/m², and dried in an oven set at 50° C. to thereby produce a masking adhesive-coated white film. Another white film (Production Example 1) was laminated onto the coated surface of the masking adhesive-coated white film that had been taken out of the oven, using a nip roll, and then this was rolled up around a roll to obtain a laminate white film.

The laminate white film was cut into sheets, and left in an aging room set at 50° C. for 12 hours. Thus, card paper sheets having a thickness of 404 μm were obtained.

Example 2

Using a gravure coater, the color pigment coating composition (1) was applied to the white film (Production Example 2) in a dry amount of 2 g/m², and dried in an oven set at 70° C. to thereby produce a masking layer-coated white film.

Next, also using a gravure coater, the adhesive composition was applied to another white film (Production Example 2) in a dry amount of 2 g/m², and dried in an oven set at 50° C. This was laminated onto the masking layer-coated white film prepared in the above, using a nip roll, and then this was rolled up around a roll to obtain a laminate white film.

The roll of the laminate white film was left in an aging room set at 50° C. for 12 hours, and then cut into sheets, and left in an aging room set at 40° C. for 24 hours. Thus, card paper sheets having a thickness of 304 μm were obtained.

Example 3

Using a gravure coater, the color pigment coating composition (1) was applied to the white film (Production Example 3) in a dry amount of 2 g/m², and dried in an oven set at 70° C. to thereby produce a masking layer-coated white film. Two rolls of the same film were produced.

Also using a gravure coater, the adhesive composition was applied to one of the two rolls of the masking layer-coated white film, in a dry amount of 3 g/m², and dried in an oven set at 50° C. This was laminated onto the other masking layer-coated white film by the use of a nip roll, and then rolled up around a roll to obtain a laminate white film.

The laminate white film was cut into sheets, and left in an aging room set at 70° C. for 12 hours. Thus, card paper sheets having a thickness of 347 μm were obtained.

Example 4

Using a gravure coater, the color pigment coating composition (2) was applied to the white film (Production Example 4) in a dry amount of 5 g/m², and dried in an oven set at 80° C. to thereby produce a masking layer-coated white film.

Next, also using a gravure coater, the adhesive composition was applied to another white film (Production Example 4) in a dry amount of 3 g/m², and dried in an oven set at 60° C. This was laminated onto the previously-prepared, masking layer-coated white film by the use of a nip roll, and then rolled up around a roll to obtain a laminate white film.

The laminate white film was cut into sheets, and left in an aging room set at 40° C. for 24 hours. Thus, card paper sheets having a thickness of 267 μm were obtained.

Comparative Example 1

Production Example in JP-UM-B-61-198 was referred to.

Concretely, a mixture of an extrudable material comprising 100 parts of polypropylene having a melt index of 1.0 and 15 parts of polystyrene, with 15 parts of $CaCO_3$ was mixed in a mixing roll. The resulting mixture was strandwise extruded out, cut and granulated. The resulting granules were melted in an extruder at 260° C., sheetwise extruded out through a die, and then cooled to about 20° C. by the use of a roll. Thus a substrate layer film was obtained. The substrate layer film was stretched 4-fold in the machine direction by the use of a stretcher, and a film monoaxially oriented in the machine direction was thus obtained.

Apart from it, a mixture of 15 parts of titanium oxide, 27 parts of calcium carbonate and 100 parts of polypropylene having a melt index of 10 was sheetwise extruded out through a vented extruder, and this was laminated on both faces of the above monoaxially-oriented film to obtain a three-layered laminate. Next, the laminate was stretched 7-fold at 150° C. by the use of a tenter stretcher, and then thermally set at a temperature of 160° C., and thereafter its surface was subjected to corona discharge treatment. Next, this was cooled to room temperature, and its edges were trimmed away. Thus, three-layered synthetic paper was obtained.

The synthetic paper is composed of a base layer of a biaxially-stretched film having a thickness of 80 µm and having fine pores (porosity 37%), and surface and back layers each having a thickness of 35 µm and formed of a monoaxially-stretched film having fine pores inside it and having fine cracks in its surface.

The synthetic paper having a thickness of 150 µm was cut into sheets having a length of 636 mm and a width of 939 mm. The sheets were laminated with an isocyanate-type adhesive containing 30% by weight of titanium oxide whiskers [Toyo Morton's Adcoat BLS3693 (trade name)] to obtain card paper.

Comparative Example 2

Using a gravure coater, the adhesive composition was applied to the white film (Production Example 2) in a dry amount of 2 g/m², then dried in an oven set at 50° C. This was laminated with another white film by the use of a nip roll, and then rolled up around a roll to obtain a laminate white film.

The roll of the laminate white film was left in an aging room set at 50° C. for 12 hours, and then cut into sheets. The sheets were left in an aging room set at 40° C. for 24 hours. Thus was obtained card paper having a thickness of 302 µm but not having a masking layer.

Test Example (Fabrication of Playing Cards)

The card paper obtained in Examples was printed on both the surface and the back thereof, by the use of a four-color offset printer [Mitsubishi Juko's OF-4] using oily offset inks [T&T TOKA's Best SP black, indigo, scarlet, yellow] in a transfer amount of 1.5 g/m² each. In this step, the surface was printed with a numerical pattern and the opposite face was printed with solid indigo.

Using a desk-top bar coater, a UV-curable varnish [Toyo Ink's trade name: TU504FDSS Relief Varnish] was applied to the surface and the back of the thus-printed card paper in an amount of 5 g/m² each, and then this was cured through exposure to UV of 100 mJ/m². Using a toothed blanking mold, this was blanked into playing cards each having a length of 89 mm and a width of 57 mm. In blanking it, the sample was so controlled that its side having a higher flexural modulus of elasticity could be in the lengthwise direction.

(Ink Adhesiveness)

The surface of the playing card was rubbed 10 times with a ¥500 coin, and the adhesiveness of the ink to the surface was observed. The sample was evaluated according to the following three ranks.
Good (◯): No ink peeled at all.
Average (Δ): In some area, ink partly peeled.
Not Good (x): In some area, ink peeled.

(Bending Stability)

The playing card was rounded like a 1-cm tube in the lengthwise direction thereof, and kept as such for 1 hour. Then, the surface condition was observed, and the sample was evaluated according to the following three ranks.
Good (◯): No change at all.
Average (Δ): Fine cracks formed in the surface.
Not Good (x): Folded wrinkles formed.

(Bending Restoration)

The playing card was rounded in the lengthwise direction to form a just one circle with hands and kept as such for 30 seconds. Then, this was left on a glass plate, and after 30 seconds, the lifting height from the glass plate at four corners of the sample was measured. The sample was evaluated according to the following three ranks.
Good (◯): The lifting height was at most 3 mm.
Average (Δ): The lifting height was at most 5 mm.
Not Good (x): The lifting height was over 5 mm.

(Scratch Resistance)

10 playing cards were scratched with the nail of a thumb at their corners, and the number of the cards that could be differentiated from the others owing to the scratch formed in them was counted. From this, the sample was evaluated according to the following three ranks.
Good (◯): No card was differentiated.
Average (Δ): Less than 3 cards were differentiated.
Not Good (x): 3 or more cards were differentiated.

(Maskability)

The playing card was held by the hand, and exposed to light from a fluorescent lamp (30 W) and a halogen light (100 W) through its back, whereupon the card was checked as to whether or not the pattern in the surface thereof could be identified through it. From this, the sample was evaluated according to the following three ranks
Good (◯): Not identified at all.
Average (Δ): Identified through the light from the halogen light.
Not Good (x): Identified through the light from the fluorescent lamp. The test results are all shown in Table 4.

TABLE 4

| | | Production Example | Making Layer constitution | thickness (µm) | Thickness of All Layers (µm) | Porosity (%) | Flexural Modulus of Elasticity (MPa) | Whole Light Transmittance (%) | Pencil Hardness |
|---|---|---|---|---|---|---|---|---|---|
| Example | 1 | 1 | color pigment mixed in adhesive layer | 4 | 404 | 12 | 4560 | 0.22 | 4H |
| | 2 | 2 | adhesive layer/color pigment layer | 2/2 | 304 | 15 | 4660 | 0.12 | 4H |

TABLE 4-continued

| | | | | | | | | | |
|---|---|---|---|---|---|---|---|---|---|
| | | 3 | 3 | color pigment layer/ adhesive layer/color pigment layer | 2/3/2 | 347 | 9 | 4720 | 0.08 | 4H |
| | | 4 | 4 | adhesive layer/color pigment layer | 3/5 | 267 | 4 | 4830 | 0.15 | 5H |
| Comp. Ex. | 1 | — | Example in JP-UN-B-61-198 | | 270 | 27 | 3460 | 0.13 | 3H |
| | 2 | 1 | adhesive layer alone | 2 | 302 | 16 | 4550 | 8.64 | 4H |

| | | Production Example | Maximum Curl Height (mm) | Ink Adhesiveness | Bending Stability | Bending Restoration | Scratch Resistance | Mask- ability |
|---|---|---|---|---|---|---|---|---|
| Example | 1 | 1 | 0.5 | ○ | ○ | ○ | ○ | ○ |
| | 2 | 2 | 0.0 | ○ | ○ | ○ | ○ | ○ |
| | 3 | 3 | 0.0 | ○ | ○ | ○ | ○ | ○ |
| | 4 | 4 | 0.1 | ○ | ○ | ○ | ○ | ○ |
| Comp. Ex. | 1 | — | 0.5 | ○ | ○ | x | x | ○ |
| | 2 | 1 | 0.2 | ○ | ○ | ○ | ○ | Δ |

According to the invention, there is provided plastic card paper having good flexibility and stability, curling little and having good scratch resistance, maskability and printability. The card paper of the invention is extremely useful, as utilizable for various cards such as playing cards, game cards, trading cards, scratch cards, prepaid cards, certificates.

What is claimed is:

1. A paper for card wherein it has a laminate structure consisting of a porous white thermoplastic resin film symmetrically put on both faces of a masking layer,
    a surface and a back of the paper for card have a pencil hardness of from 4H to 9H,
    the masking layer consists of 1 to 80% by weight of pigment and 1 to 99% by weight of an adhesive,
    the porous white film is a multilayered structure of film layers, and
    wherein the paper has a porosity of 1 to 10%.

2. A paper for card having a porosity of 1-10%,
    wherein it has a laminate structure consisting of a porous white film symmetrically put on both faces of a masking layer, and
    a surface and a back of the paper for card have a pencil hardness of from 4H to 9H,
    wherein the masking layer consists of two coating layers of a color pigment layer and an adhesive layer, and the porous white film is a multilayered structure of film layers.

3. A paper for card having a porosity of 1-10%,
    wherein it has a laminate structure consisting of a porous white film symmetrically put on both faces of a formed by coating masking layer, and
    a surface and a back of the paper for card have a pencil hardness of from 4H to 9H,
    wherein the masking layer consists of a structure of a color pigment layer, an adhesive coating layer and a color pigment coating layer laminated in that order, and the porous white film is a multilayered structure of film layers.

4. The paper for card as claimed in claim 1, wherein the white film is stretched at least monoaxially.

5. The paper for card as claimed in claim 1, wherein the white film contains a biaxially-stretched layer.

6. The paper for card as claimed in claim 1, wherein the white film comprises from 30 to 99% of the thermoplastic resin and from 1 to 70% of an inorganic fine powder and/or an organic filler.

7. The paper for card as claimed in claim 6, wherein the thermoplastic resin contains a polyolefin.

8. The paper for card as claimed in claim 1, which has a thickness of from 80 to 1000 μm.

9. The paper for card as claimed in claim 1, which has a flexural modulus of elasticity of from 3500 to 10000 MPa.

10. The paper for card as claimed in claim 1, which has a whole light transmittance of at most 1.0%.

11. The paper for card as claimed in claim 1, wherein a 10 cm ×10 cm sheet obtained from the paper for card has a maximum curl height of at most 3 mm after maintaining under a condition of 60° C. for 7 days.

12. A playing card fabricated by printing both faces of the paper for card of claim 1.

13. A playing card fabricated by printing both faces of the paper for card of claim 1 followed by forming a clear layer on at least one face thereof.

* * * * *